(12) United States Patent
Tso

(10) Patent No.: US 6,742,047 B1
(45) Date of Patent: *May 25, 2004

(54) METHOD AND APPARATUS FOR DYNAMICALLY FILTERING NETWORK CONTENT

(75) Inventor: Michael Man-Hak Tso, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 803 days.

(21) Appl. No.: 09/000,759

(22) Filed: Dec. 30, 1997

Related U.S. Application Data

(60) Provisional application No. 60/041,004, filed on Mar. 27, 1997.

(51) Int. Cl.[7] .............................................. G06F 15/16
(52) U.S. Cl. ..................................................... 709/246
(58) Field of Search ................................ 709/217, 218, 709/219, 229, 200, 201, 202, 203, 246; 707/6

(56) References Cited

U.S. PATENT DOCUMENTS

| | | | |
|---|---|---|---|
| 5,373,375 A | 12/1994 | Weldy | 358/523 |
| 5,517,612 A | 5/1996 | Dwin et al. | 395/166 |
| 5,544,320 A | 8/1996 | Konrad | 395/200.09 |
| 5,673,322 A | 9/1997 | Pepe et al. | 380/49 |
| 5,684,969 A | 11/1997 | Ishida | 395/342 |
| 5,701,451 A | 12/1997 | Rogers et al. | 395/600 |
| 5,706,434 A | 1/1998 | Kremen et al. | 395/200.09 |
| 5,724,556 A | 3/1998 | Souder et al. | 395/500 |
| 5,727,159 A | 3/1998 | Kikinis | 395/200.76 |
| 5,742,905 A | 4/1998 | Pepe et al. | 455/461 |
| 5,754,938 A * | 5/1998 | Herz et al. | 709/219 |
| 5,754,939 A * | 5/1998 | Herz et al. | 709/219 |
| 5,768,510 A | 6/1998 | Gish | 395/200.33 |
| 5,805,735 A | 9/1998 | Chen et al. | 382/239 |
| 5,835,087 A * | 11/1998 | Herz et al. | 709/217 |
| 5,890,152 A * | 3/1999 | Rapaport et al. | 707/6 |

* cited by examiner

Primary Examiner—Paul H. Kang
(74) Attorney, Agent, or Firm—Kenyon & Kenyon

(57) ABSTRACT

A method for dynamically filtering a data object to be rendered on a client device includes the steps of scanning the data object for content satisfying a predetermined selection criterion, and selectively providing the data object to the client device in accordance with a predetermined filtering preference if the predetermined selection criterion is satisfied.

14 Claims, 3 Drawing Sheets

METHOD AND APPARATUS FOR DYNAMICALLY FILTERING NETWORK CONTENT

This application claims the benefit of the identically-titled U.S. Provisional Application No. 60/041,004, filed Mar. 27, 1997 by Michael M. Tso and assigned to Intel Corporation, the disclosure of which is expressly incorporated herein by reference.

BACKGROUND OF THE INVENTION

1. Field of the Invention

The present invention relates generally to the field of data communications for personal computers (PCs), and in particular to a system for dynamically filtering network content to be downloaded to a network client.

2. Related Art

The Internet is quickly becoming the preferred data communications medium for a broad class of computer users ranging from private individuals to large multi-national corporations. Such users now routinely employ the Internet to access information, distribute information, correspond electronically, and even conduct personal conferencing. An ever-growing number of individuals, organizations and businesses have established a presence on the Internet through "Web pages" on the World-Wide Web ("the Web").

As the popularity of the Internet has grown, so too have concerns about the nature of some of the content available on the largely-unregulated network. For example, many parents are concerned about the ready availability of obscene and/or pornographic material. Accordingly, there has been an effort to develop mechanisms for selectively preventing content from being downloaded to particular users or groups of users.

Existing content blocking technologies are generally based on URL (Uniform Resource Locator) classifications, rather than on the content itself. For example, a list of URLs may be pre-categorized (for example, as violent, obscene), often manually by humans. Any request for a data object is then checked against this list and access is denied if the requested URL is in a list for a category that the user or supervisor (such as an employer or parent) has previously decided to block. This review and pre-categorization of URLs is a significant drawback, limiting the flexibility and responsiveness of such blocking schemes. Accordingly, there is a need for a content-based blocking mechanism that may be used in place of, or in conjunction with, existing blocking schemes.

SUMMARY OF THE INVENTION

An embodiment of the present invention provides a method for dynamically filtering a data object to be rendered on a client device. According to this embodiment, the data object is scanned for content satisfying a predetermined selection criterion. If the predetermined selection criterion is satisfied, the data object is selectively provided to the client device in accordance with a predetermined filtering preference.

DETAILED DESCRIPTION

Figure 1:
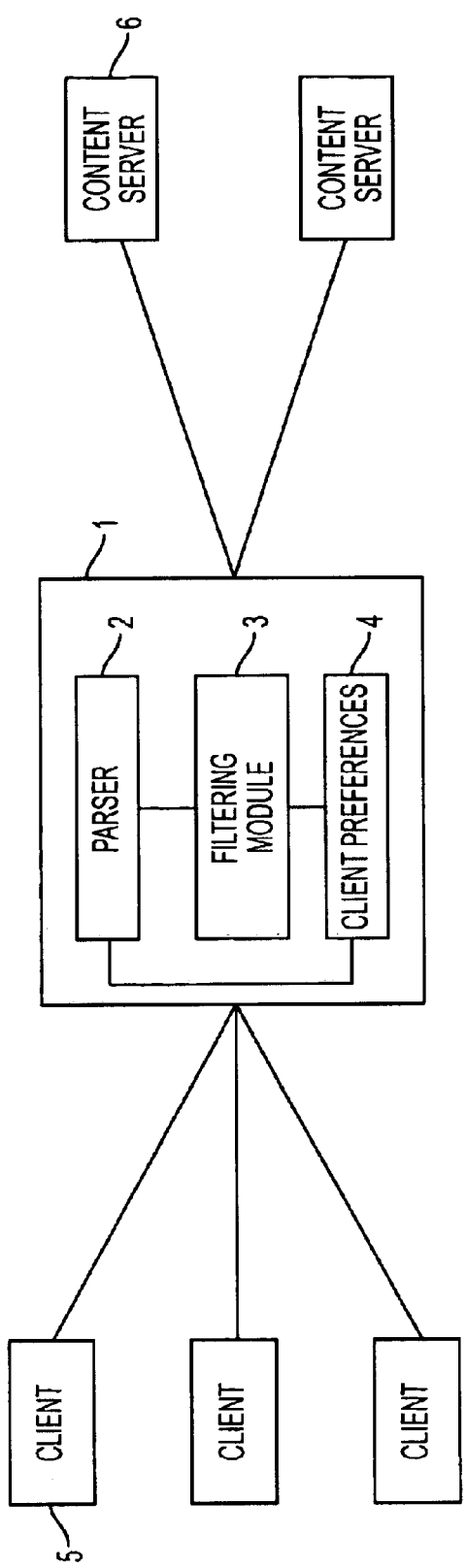
FIG. 1 is a schematic diagram illustrating a network proxy configured to dynamically filter content according to an embodiment of the present invention.

According to an embodiment of the present invention, traditional methods of content blocking may be enhanced or replaced by the addition of content-based blocking. Content-based blocking involves scanning for predetermined keywords or codes in the content itself (for example, the text portion, hyperlinks contained in text, image titles), and blocking sites or pages based on if and/or how many of the predetermined keywords were found. Content-based blocking may be advantageously used to identify and block Web pages/sites that escape static blocking algorithms based upon URL lists. Such static approaches are inherently difficult to manage because it is difficult to keep pace with the thousands of new pages that are published on the Internet daily. Moreover, there is a risk that a Web page requested by a user has not been categorized correctly, or even categorized at all. By contrast, embodiments of the present invention delay checking until the moment the user requests a Web page, thereby providing an extra level of security. Moreover, when combined with existing approaches, content-based blocking according to embodiments of the present invention may greatly increase the effectiveness of known content blocking mechanisms.

In keeping with the embodiments disclosed herein, predetermined selection criteria, such as keywords, may be defined by individual users or system administrators of network devices on a session-by-session or a persistent basis. Such predetermined selection criteria may apply to specific users, or to a group of users. Moreover, users may be provided with the ability to dynamically modify the selection criteria (for example, adding or deleting keywords, selecting from a list of keywords, selecting categories or other groups of keywords).

Likewise, predetermined filtering preferences may be established to govern filtering of content when a predetermined selection criterion is satisfied. The predetermined filtering preferences might include dynamically altering content prior to downloading, such as by removing or replacing any detected keywords. Such a capability has many advantageous uses, such as censoring only certain words from the reader but not an entire page (similar to how the television and radio industries "beep" obscene language from broadcast material). Embodiments of the present invention may also be used to automatically rate unrated content and/or to enforce rating systems or conventions with which content providers may be obligated to comply. For example, it is possible to block out sites or pages based on predetermined rating information embedded in pages, much like the so-called "V-chip" is intended to do for television broadcasts. Here, however, the blocking mechanism may be specifically directed to interactive network data (not just TV), and blocking may advantageously be performed before the content is transmitted to a user. Moreover, content may be automatically rated independently of the content provider. In such cases, messages may be optionally transmitted to such content providers informing them of ratings assigned to their content. Ratings and rating criteria may also be published or otherwise made available for use by content providers, users, or other interested entities.

Referring now to FIG. 1, according to one embodiment of the present invention a network device 1 includes a parser 2 coupled to a filtering module 3. In this particular embodiment, network device 1 comprises a network proxy through which a plurality of client devices 5 access network resources such as content servers 6. In other embodiments, network device 1 may comprise a local proxy coupled to a client device, a client device itself, a content server, a browser, a server, a router, a stack, or any other suitable data processing device in a communications chain between a requesting client device 5 and a responding content server 6. Parser 2 and filtering module 3 may be implemented, for example, as software modules within network device 1 including instructions for carrying out the functionality described herein.

In the embodiment of FIG. 1, network device 1 includes a client preference table 4 coupled to parser 2 and filtering module 3. Client preference table 4 may comprise, for example, a set of user-controlled content selection criteria and filtering preferences, and may be indexed by a user name and/or an IP (Internet Protocol) address. Each user name/IP address entry may optionally have an associated security password stored in client preference table 4. According to this embodiment, when a user begins a session with network device 1 for the first time, such as when client device 5 first requests a network data object through network device 1, the user of client device 5 may "sign on" to network device 1 by providing a password.

Upon receipt of information identifying a user, such as a userid or IP address for client device 5 contained in a registration request packet, parser 2 of network device 1 may attempt to retrieve from client preferences table 4 any previously-stored filtering parameters for that user or client device 5. Parser 2 may optionally be configured to perform authentication processing to ensure the user is properly authorized to access network device 1. Such authentication may be accomplished using any existing or later-developed authentication mechanism. If previously-stored filtering parameters are found in client preference table 4, parser 2 may store those parameters in a dynamic table (not shown) keyed, for example, by IP address. This dynamic table may then be used in connection with dynamic filtering of content to be passed to client device 5 during a current session. In addition to the foregoing, parser 2 may include instructions for invalidating any existing entries in client preference table 4 upon receipt of more current user preference information.

In this embodiment, whenever network device 1 receives a request for a data object from client device 5, parser 2 scans its dynamic table (or client preference table 4) for an entry matching an IP address or other user identifier included in the received request packet. Alternatively, this processing could be initiated upon receipt of a data object from content server 6 for downloading to client device 5. If a matching entry is found, network device 1 invokes filtering module 3 after retrieving the requested data object (either from content server 6 or from a cache storage (not shown) coupled to network device 1).

Filtering module 3 scans the requested data object (typically comprising an HTML (HyperText Markup Language) file) for any predefined keywords or other predetermined selection criterion specified in the dynamic table entry. The dynamic table entry may also include indicators specifying filtering preferences used to control how filtering module 3 should respond to satisfaction of a predetermined selection criterion. For example, the user of client device 5 may wish to entirely block any Web page containing one or more predefined keywords, in which case filtering module 3 ensures that no part of the data object is transmitted to, or rendered by, client device 5. Filtering module 3 may also be configured to provide an appropriate notification to a user of client device 5 as soon as a failure criteria is met (for example, a designated keyword is located). Where the requested data object comprises an HTML file with one or more embedded references to other objects, such as images, blocking the initial HTML file advantageously also prevents any referenced object from reaching client device 5. Thus, no part of the offending data object is rendered to the user.

Figure 3:
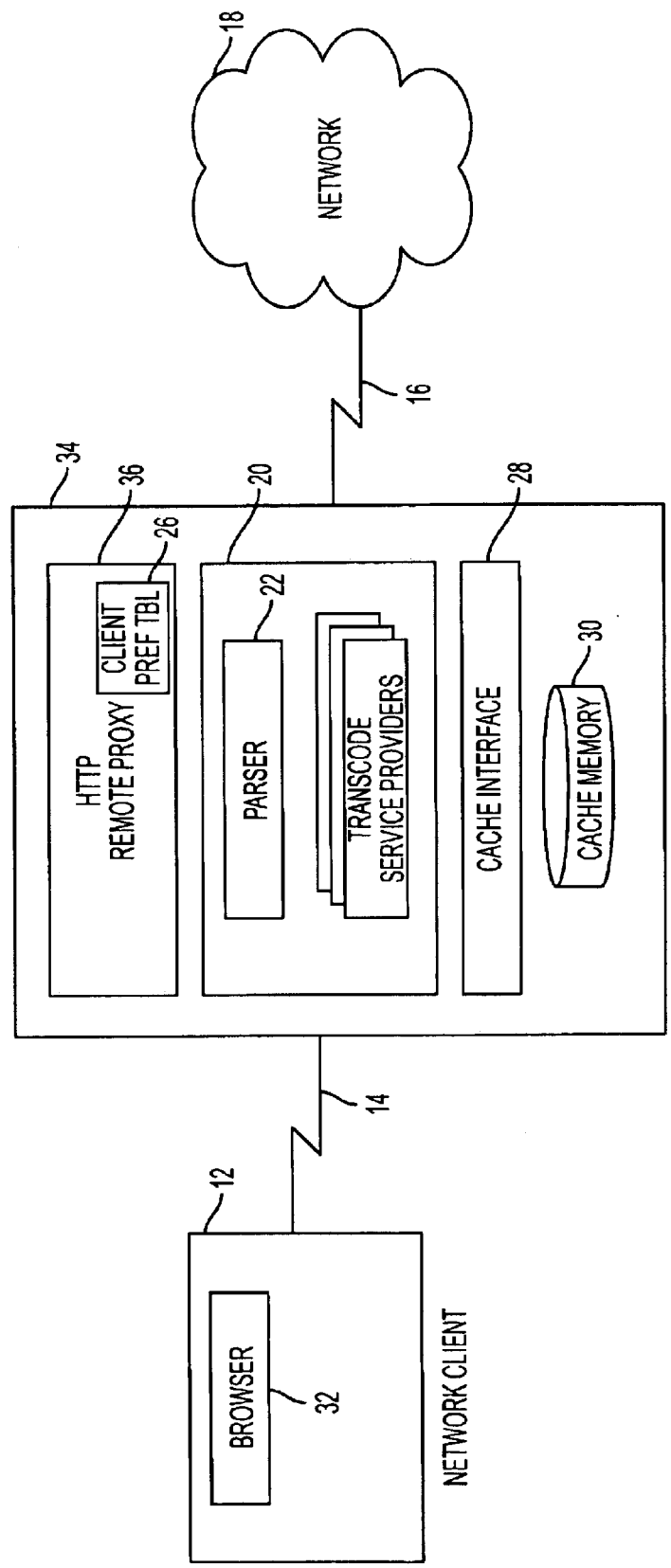
FIG. 3 is a schematic diagram illustrating a configuration in which an embodiment of the present invention may be implemented.

The foregoing embodiment may be implemented, for example, as part of a system for dynamically transcoding network content. With reference to FIG. 3, network client 12 communicates with an external network 18 through a transcoding server 34. Network client 12 includes a browser 32, such as the Netscape Navigator v.3.0 browser (although the invention is not limited in this respect), which manages the presentation of data to a user. In the illustrated arrangement, network client 12 is "non-enabled," meaning no specialized transcoding software is preloaded on network client 12. Network 18 may comprise, for example, the Internet. In this particular arrangement, network client 12 communicates requests for information to, and receives information from, transcoding server 34 over a client/server communications link 14. Transcoding server 34 in turn communicates with computers resident on network 18 through server/network communications link 16. The respective communications links 14, 16 may comprise any suitable communications media known in the art.

Transcoding server 34 may be configured to provide a wide variety of transcoding services to network client 12 and/or network devices, such as content servers, with which network client 12 communicates. In this context, the term "transcode" refers to virtually any type of addition, deletion or modification of data transmitted to or from network client 12 by or through transcoding server 34. Examples of such transcoding services include data compression, image scaling, and dynamic removal of predetermined content. In the context of the present invention, the provision of dynamic content blocking may be the only transcoding service provided to a particular client device, or may be only one of a variety of services.

As illustrated in FIG. 3, transcoding server 34 may include a transcoder 20 with a parser 22 and a plurality of transcode service providers 24. Parser 22 is configured to act upon data received by transcoder 20, such as a request for a network object generated by client device 12 or a reply to such a request provided by a content server or other device on network 18. In this particular example, parser 22 selectively invokes one or more of transcode service providers 24 based upon a predetermined selection criterion. With reference to FIG. 1, filtering module 3 may be implemented, for example, as a transcoding service provider 24.

In the arrangement shown in FIG. 3, transcoding server 34 includes an HTTP (HyperText Transfer Protocol) remote proxy 36, capable of accessing network 18 over server/network communications link 16. HTTP remote proxy 36 provides functionality different from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12.

Looking more closely at the arrangement shown in FIG. 3, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language), in addition to providing content blocking functionality as discussed above. Transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular implementation, parser 22 is designed in compliance with the Windows Open Systems Architecture (WOSA), and may be implemented as a Win32 DLL (Dynamic Link Library). The WOSA architecture, described in Readings on Microsoft Windows and WOSA (Microsoft Corp. 1995), enables additional transcode service providers 24 to be dynamically added to the system to provide new features and/or better transcoding algorithms, while at the same time not requiring changing or retesting other software components in the system.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this particular embodiment is through parser 22.

In operation, transcoder 20 may use an HTTP Read( ) call to read data from a specified cached object data stream. For example, transcode service provider 24 may invoke this call and tunnel stream data through HTTP remote proxy 36 directly to network client 12. Similarly, an HTTP Write( ) call may be used to cache data from a new HTTP data stream. This call will append an incoming data stream received from, for example, a Web server or transcode service provider 24, to an opened cache stream which may be concurrently read using the Read( ) call.

In one particular embodiment, parser 22 may be configured to include the following calls:

GetObject(URL, InParams, &OutParams, &OutStream, . . . );
PutObject(URL, InParamStruct, &InStream, &OutParams, &OutStream, . . . ).

Parser 22 may use such calls to manage the provision of requested content to network client 12. For example, the GetObject( ) call may be used to service non-enabled client requests, and returns a non-transcoded (original) version of a specified hypertext object. In this embodiment, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

In this particular arrangement, when network client 12 requests a hypertext object, HTTP remote proxy 36 uses the GetObject( ) call to retrieve the hypertext object from parser 22. If the hypertext object is not found, parser 22 uses the CreateEntry( ) call to create an entry (in effect, a placeholder) in server-side cache memory 30 for the new object. The new entry is returned to HTTP remote proxy 36, which requests the hypertext object from network 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it (for example, scan for predetermined content and delete it if found), and place it within the entry of server-side cache memory 30. The current thread immediately returns to HTTP remote proxy 36, which once again calls GetObject( ). In this embodiment, this case will always result in a cache hit. This thread then works simultaneously with the separate thread in the PutObject( ) to tunnel data (either original or transcoded) from transcoding server 34 to network client 12.

The configuration shown in FIG. 3 is just one of many different ways in which embodiments of the present invention may be implemented. For example, the content filtering functionality could be implemented in a so-called "enabled client" containing specialized software for blocking predetermined content on the client device. Similar to the configuration of FIG. 3, such specialized software may be implemented, for example, as a client-side transcode service provider, as part of a local proxy, as part of the browser running on the client device, or as an add-in module running on the client device. The present invention is not limited in this regard.

Referring back to FIG. 1, in accordance with another embodiment of the present invention a content provider may embed special data fields into the content which categorize or rate the content. In such a case, parser 3 may be configured to scan for these data fields in the content, and cause filtering module 3 to take appropriate action. Filtering module 3 may optionally be configured to delete such data fields from the content after taking some action (for example, blocking portions of the content) in order to avoid causing an error in a browser (not shown) of client device 5 which may be incapable of processing content including such embedded data fields. Where a user has elected to replace or delete certain keywords (or sentences or paragraphs in which such keywords are found), network device 1 may send any data which has passed filtering module 3 to client device 5 as soon as a suitable unit of data has been cleared. Network device 1 may alternatively be configured to withhold a current unit of operation (for example, a sentence or paragraph) until the unit as a whole is determined to either pass or fail the checks of filtering module 3.

Figure 2:
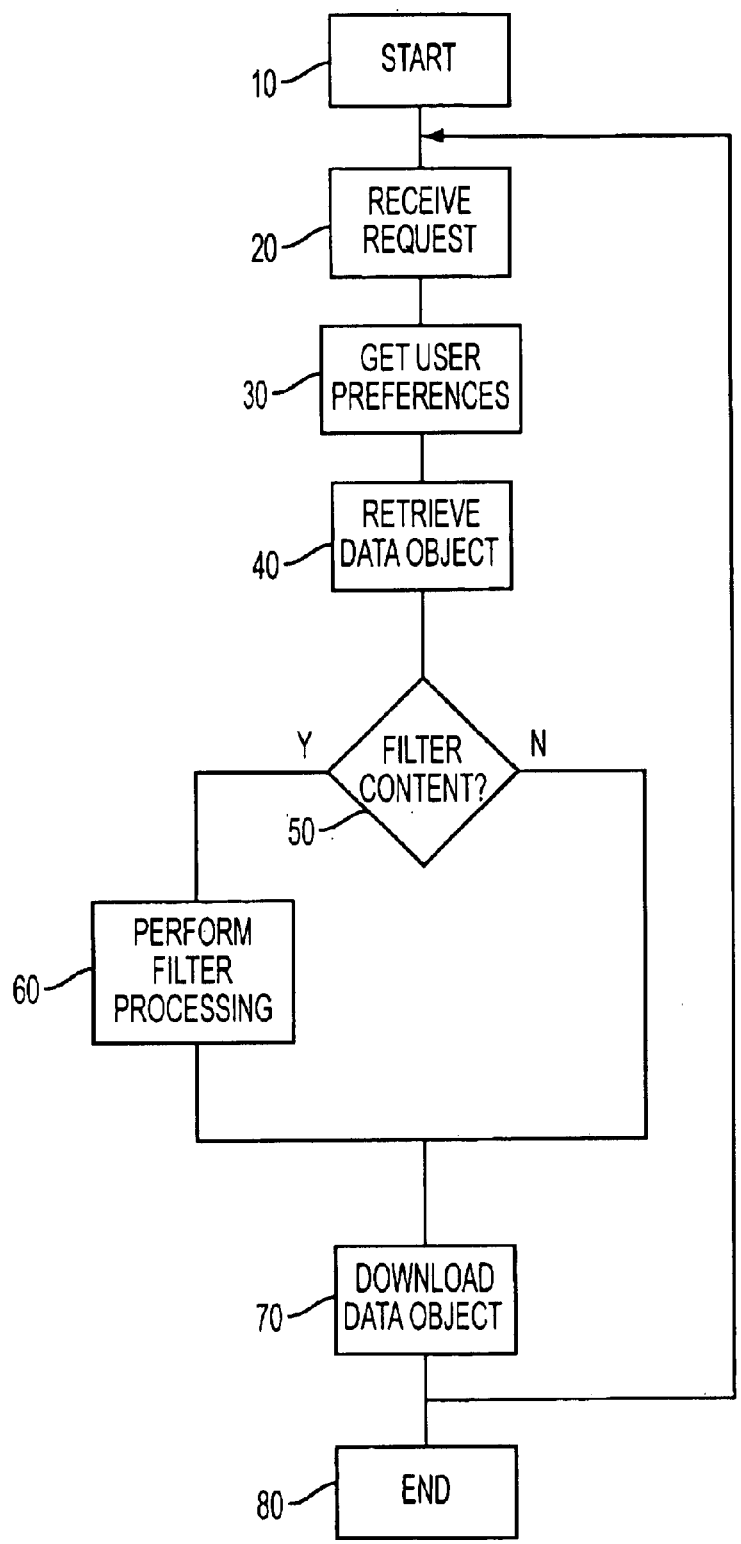
FIG. 2 is a flow diagram illustrating a method for dynamically filtering content according to an embodiment of the present invention.

By way of further illustration, the flow diagram of FIG. 2 describes a dynamic filtering method according to another embodiment of the present invention. According to this embodiment, processing begins upon receipt of a request for a data object (Step 20). User identification information is then extracted from the request to determine the existence of predefined content filtering preferences (Step 30). If such preferences are found, a flag may be set to ensure that all content to be downloaded to the requesting device is first filtered. Following retrieval of the requested data object from, for example, a content server or local cache storage, a determination is made as to whether the content is to be filtered before downloading (Steps 40–50). If so, the retrieved data object is passed through a filtering routine for processing in accordance with the predefined filtering preferences (Step 60). Content passing the filtering routine, or the entire data object if no filtering is to be performed, is then downloaded to the requesting device (Step 70).

In a variation on the above-described embodiments, caching techniques may be applied to more efficiently use available resources. For example, a data object stored in a cache may be compared to keywords for some or all of a set of predefined categories (for example, adult, violent) and the results stored in the cache along with the data object. Any future request where a user preference is based on one of the predefined categories may then be satisfied essentially immediately from the cache. Similarly, for keyword replacement, data objects that have had certain keywords replaced may be stored as alternate representations of the same data object in the cache. Furthermore, should a cached object be invalidated (for example, the source on the server has changed), all cached results together with the cached object may be discarded from the cache in this embodiment.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described largely with reference to embodiments for processing requests for data from the Internet, persons skilled in the art will recognize that it is also applicable to other networking environments. For example, embodiments of the present invention may be used to filter data transmitted between devices on an intranet (typically a secure corporate network), or in an ISP environment where dial-up users get access to the network operated by an independent service provider. In such environments, network requests generated by users (either all users or a select group) involving secure access may go through a filter mechanism such as that disclosed herein in a manner similar to what is currently done for setting up firewall proxies. Existing technology, such as router filters, may be used for this purpose. Such an arrangement is beneficial in that it reduces the opportunity for users to bypass the filtering mechanism.

Other variations of the embodiments disclosed above are also possible. For example, rather than blocking Web sites containing content meeting some predetermined selection criterion, the same technology may be used to allow users to access only those Web sites meeting some predetermined selection criterion. Such an approach may be used, for example, to provide a "family channel" comprising Web sites which lack any offensive content, or other channels limited to Web sites relating to any particular subject matter. The selection criterion might comprise, for example, a list of predefined keywords, categories, or URLs.

The foregoing is a detailed description of particular embodiments of the present invention. The invention embraces all alternatives, modifications and variations that fall within the letter and spirit of the claims, as well as all equivalents of the claimed subject matter. For example, as noted above, rather than implementing filtering functionality in a network proxy, such functionality may alternatively be implemented in a client device (equipped with a local proxy or treating localhost like a proxy), in a browser installed in a client device, in other network devices such as servers, or even distributed across combinations of the foregoing. In addition, filtering preferences may be established at a level higher than the user or client level. For example, an organization may establish filtering preferences applicable to all of its employees. Persons skilled in the art will recognize from the foregoing detailed description that many other alternatives, modifications and variations are possible.

What is claimed is:

1. A method for dynamically filtering content in a data object to be rendered on a client device, said method comprising the steps of:

receiving a request for a user-specified data object from a client device;

retrieving the user-specified data object in response to the request from the client device;

scanning the user-specified data object for content satisfying a predetermined selection criterion;

modifying content in the user-specified data object in accordance with a predetermined filtering preference if said predetermined selection criterion is satisfied; and providing the modified user-specified data object to the client device.

2. The method of claim 1, wherein said step of scanning the requested data object comprises searching the requested data object for a predefined text string.

3. The method of claim 2, wherein said predefined text string comprises a keyword.

4. The method of claim 2, wherein said predefined text string comprises a content rating code residing in the data object at the time of retrieval.

5. The method of claim 1, further comprising the step of storing the data object in a cache.

6. The method of claim 1, wherein said step of modifying content in the data object comprises deleting a portion of the content.

7. The method of claim 1, wherein said step of modifying content in the data object comprises replacing a portion of the content.

8. The method of claim 1, wherein said predetermined selection criterion comprises a set of keywords associated with a given subject matter.

9. A storage medium including a set of instructions for execution by a computer, the computer being coupled to a device for rendering a data object to a user, said set of instructions comprising instructions for:

receiving a request for a user-specified data object from a client device;

retrieving the user-specified data object in response to the request from the client device;

scanning the user-specified data object for content satisfying a predetermined selection criterion;

modifying content in the user-specified data object in accordance with a predetermined filtering preference if said predetermined selection criterion is satisfied; and providing the modified user-specified data object to the client device.

10. The storage medium of claim 9, wherein the storage medium comprises a magnetic storage device.

11. The storage medium of claim 9, wherein the storage medium comprises a memory installed in the computer.

12. The storage medium of claim 9, wherein the set of instructions further comprises instructions for preventing content corresponding to said predetermined selection criterion from being rendered.

13. The storage medium of claim 9, wherein the set of instructions further comprises instructions for deleting content from the data object in accordance with said predetermined filtering preference.

14. The storage medium of claim 9, wherein the set of instructions further comprises instructions for replacing content the data object in accordance with said predetermined filtering preference.

* * * * *

UNITED STATES PATENT AND TRADEMARK OFFICE
CERTIFICATE OF CORRECTION

PATENT NO. : 6,742,047 B1 Page 1 of 1
DATED : May 25, 2004
INVENTOR(S) : Michael Man-Hak Tso It is certified that error appears in the above-identified patent and that said Letters Patent is hereby corrected as shown below:

Column 10,
Lines 4-5, "replacing content the data object" should be -- replacing content from the data object --.

Signed and Sealed this

Twenty-fifth Day of October, 2005

JON W. DUDAS
*Director of the United States Patent and Trademark Office*